US012423706B2

(12) United States Patent
Klausner et al.

(10) Patent No.: US 12,423,706 B2
(45) Date of Patent: Sep. 23, 2025

(54) SYSTEMS AND METHODS FOR DISTRIBUTION ITEM PROCESSING

(71) Applicant: United States Postal Service, Washington, DC (US)

(72) Inventors: Peter Jay Klausner, Scottsdale, AZ (US); Robert E. Dixon, Jr., Haymarket, VA (US)

(73) Assignee: United States Postal Service, Washington, DC (US)

( * ) Notice: Subject to any disclaimer, the term of this patent is extended or adjusted under 35 U.S.C. 154(b) by 73 days.

(21) Appl. No.: 18/064,473

(22) Filed: Dec. 12, 2022

(65) Prior Publication Data

US 2023/0107700 A1 Apr. 6, 2023

Related U.S. Application Data

(63) Continuation of application No. 16/452,407, filed on Jun. 25, 2019, now Pat. No. 11,526,894.

(60) Provisional application No. 62/690,237, filed on Jun. 26, 2018.

(51) Int. Cl.
G06Q 20/40 (2012.01)
G06F 16/953 (2019.01)
G06K 7/14 (2006.01)

(52) U.S. Cl.
CPC ......... G06Q 20/407 (2013.01); G06F 16/953 (2019.01); G06K 7/1417 (2013.01)

(58) Field of Classification Search
CPC ............ G06Q 10/0837; G06Q 10/083; G06Q 20/407; G06Q 30/00
See application file for complete search history.

(56) References Cited

U.S. PATENT DOCUMENTS

| 9,692,738 | B1 | 6/2017 | Wenneman et al. |
| 2002/0013744 | A1 | 1/2002 | Tsunenari et al. |
| 2005/0055285 | A1 | 3/2005 | Myrick et al. |
| 2005/0060164 | A1 | 3/2005 | Eli Berl Illion |
| 2006/0149577 | A1 | 7/2006 | Stashluk et al. |
| 2010/0131420 | A1* | 5/2010 | Williams ............ G06Q 10/083 715/810 |
| 2012/0166296 | A1 | 6/2012 | Hammond et al. |
| 2013/0262251 | A1 | 10/2013 | Wan et al. |

(Continued)

FOREIGN PATENT DOCUMENTS

GB 2552329 A 1/2018

OTHER PUBLICATIONS

International Search Report & Written Opinion dated Sep. 4, 2019 in International Application No. PCT/US2019/038957 filed Jun. 25, 2019.

*Primary Examiner* — Calvin L Hewitt, II
*Assistant Examiner* — Amanulla Abdullaev
(74) *Attorney, Agent, or Firm* — Knobbe, Martens, Olson & Bear, LLP

(57) ABSTRACT

Systems and methods for universal item returns. A universal returns systems allows a user the ability to return an item via a distribution network whether the item was purchased at a retail location, delivered by the distribution network, or delivered by another entity. The universal returns system comprises a user interface a return request. Based on the return request, the system obtains transaction information, provides a return code, and allows scheduling item pick-up.

10 Claims, 8 Drawing Sheets

(56) References Cited

U.S. PATENT DOCUMENTS

| | | | |
|---|---|---|---|
| 2014/0006224 A1* | 1/2014 | Grigg | G06Q 30/0601 |
| | | | 705/28 |
| 2014/0058972 A1 | 2/2014 | Gventer et al. | |
| 2014/0258098 A1* | 9/2014 | Felix | G06Q 20/00 |
| | | | 705/331 |
| 2014/0279668 A1 | 9/2014 | Lievens et al. | |
| 2014/0374478 A1 | 12/2014 | Dearing et al. | |
| 2015/0186841 A1 | 7/2015 | Sar et al. | |
| 2016/0140487 A1* | 5/2016 | Tibbs | G06Q 10/0837 |
| | | | 705/330 |
| 2016/0350757 A1 | 12/2016 | Bolling et al. | |
| 2017/0183158 A1 | 6/2017 | Zhu | |
| 2018/0107978 A1* | 4/2018 | Drey | G06Q 10/0837 |
| 2018/0144301 A1 | 5/2018 | Engel et al. | |
| 2018/0349846 A1* | 12/2018 | Sever | G06Q 30/0641 |

* cited by examiner

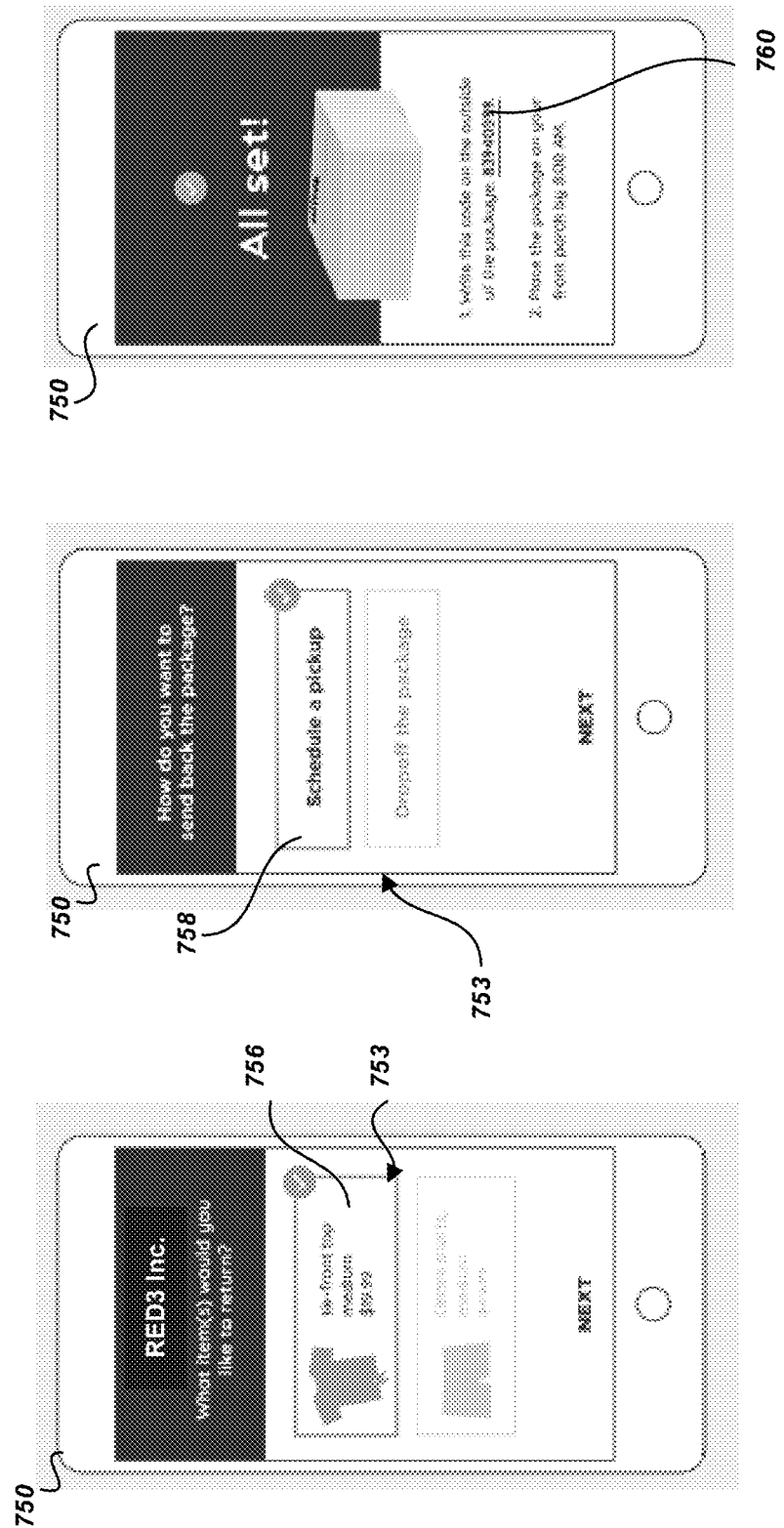

SYSTEMS AND METHODS FOR DISTRIBUTION ITEM PROCESSING

CROSS-REFERENCE TO RELATED APPLICATIONS

This application is a Continuation of U.S. application Ser. No. 16/452,407, filed Jun. 25, 2019, which claims the benefit of priority to U.S. Provisional Application No. 62/690,237, filed Jun. 26, 2018, the entire contents both of which are hereby incorporated by reference. Any and all applications for which a foreign or domestic priority claim is identified in the Application Data Sheet as filed with the present application are hereby incorporated by reference under 37 CFR 1.57.

BACKGROUND

The current disclosure relates to the field of items distribution processing including processing items for return shipment.

SUMMARY

In one aspect described herein, a system for providing item returns comprises a user interface configured to receive a return request identifier from a user; a processor in communication with the user interface; a memory in communication with the processor, the memory configured to store transaction information received from a merchant system; wherein the processor is configured to: receive the return request from the user interface; query the memory for transaction information associated with the return request identifier; provide, to the user interface transaction information, the transaction information including item information; generate a return code; provide the return code to the user interface; generate return information based on the transaction information; and associate the generated return information with the return code.

In some embodiments, the processor is further configured to receive the transaction information and the return request identifier from the merchant system and to store the transaction information, the return request identifier, and an association therebetween, in the memory.

In some embodiments, the processor is further configured to receive the transaction information from the merchant system; generate a return request identifier based on the transaction information; provide the return request identifier to the merchant system; and store, in the memory, the transaction information, the return request identifier, and an association therebetween.

In some embodiments, the return request identifier comprises an alphanumeric code.

In some embodiments, the return request identifier comprises a computer readable code.

In some embodiments, the computer readable identifier is a badge.

In some embodiments, the badge comprises the transaction information and the item information encoded therein.

In some embodiments, the badge encodes wherein the badge encodes a pointer to the transaction information.

In some embodiments, the user interface is further configured to provide item information comprising a plurality of items to the user; receive a selection of one of the plurality of items; and provide the return code to the user interface.

In some embodiments, the processor is further configured to determine whether the return request identifier is valid for a return based on the transaction information.

In some embodiments, the processor is configured to, if the transaction information is not stored in the memory, request, from the merchant system, the transaction information associated with the return request identifier.

In some embodiments, the user interface is further configured to request the user to schedule a pick-up time and to receive the scheduled pick-up time.

In another aspect described herein, a method of providing item returns comprises receiving, via a user interface, a return request identifier from a user; querying, via a processor, a memory for transaction information associated with the return request identifier; providing, to the user interface, transaction information, the transaction information including item information; generating, via a processor, a return code; providing, via the user interface, the return code to the user; generating, via the processor, return information based on the transaction information; and associating, in the memory, the generated return information with the return code.

In some embodiments, the method further comprises receiving, via a processor, the transaction information and the return request identifier from a merchant system; and storing, in the memory, the transaction information, the return request identifier, and an association therebetween.

In some embodiments, the method further comprises receiving, via a processor, the transaction information from a merchant system; generating, via a processor, a return request identifier based on the transaction information; providing, via a processor, the return request identifier to the merchant system; and storing, in the memory, the transaction information, the return request identifier, and an association therebetween.

In some embodiments, the return request identifier is an alphanumeric code.

In some embodiments, the return request identifier is a computer readable code.

In some embodiments, the computer readable identifier is a badge.

In some embodiments, the method further comprises providing, via the user interface, item information comprising a plurality of items to the user; receiving, via the user interface, a selection of one of the plurality of items; and providing, via the user interface, the return code.

In some embodiments, the method further comprises determining, via a processor, whether the return request identifier is valid for a return based on the transaction information.

In some embodiments, querying, via a processor, a memory for transaction information comprises requesting the transaction information associated with the return request identifier from the merchant system, if the transaction information is not stored in the memory.

In some embodiments, the method further comprises, requesting, via the user interface, the user to schedule a pick-up time.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIGS. 7A-7E display an embodiment of a universal returns interface on a smartphone.

Figure 1:
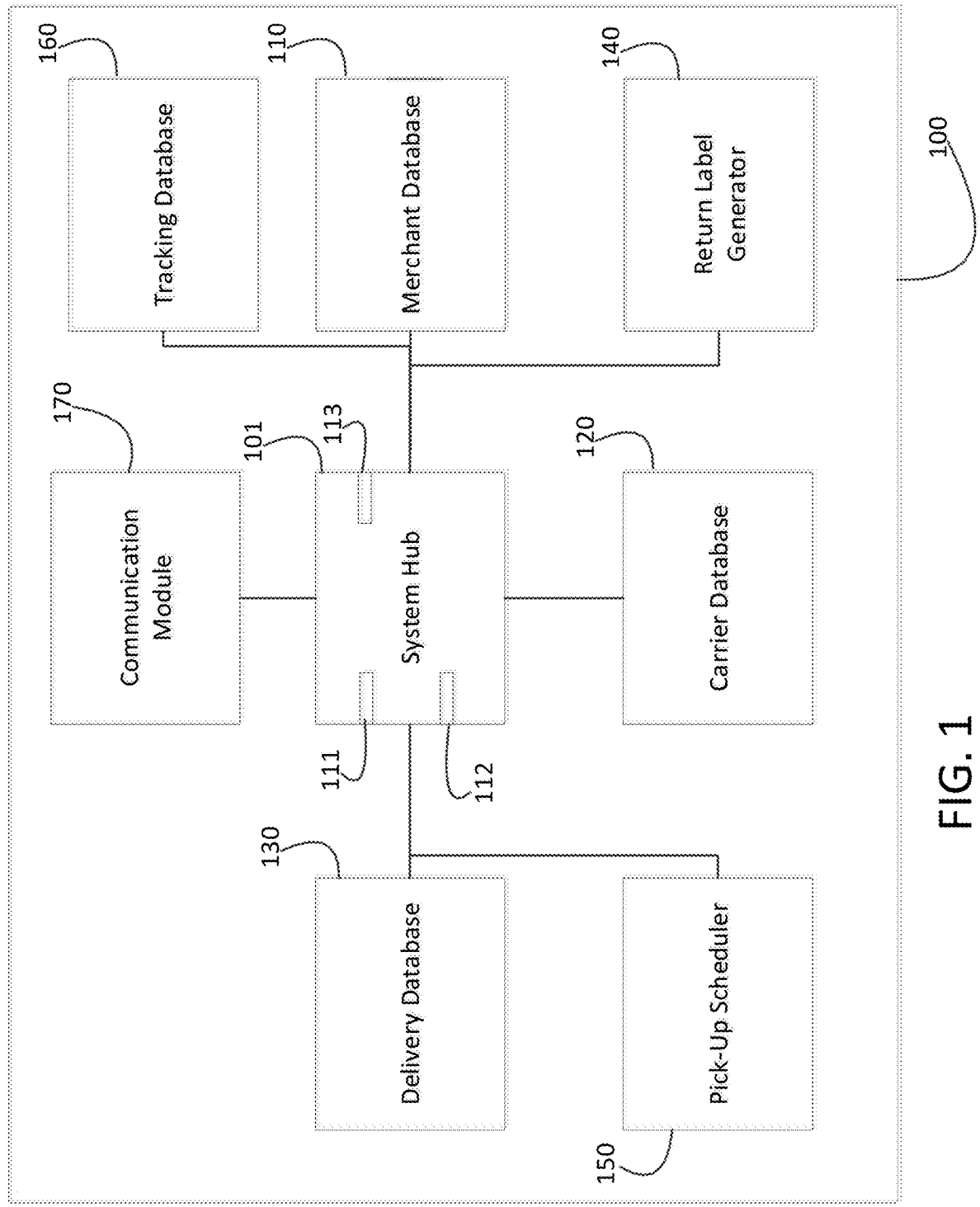
FIG. 1 is a block diagram depicting an embodiment of a system for universal returns.

Various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

As used herein, an item can be a parcel, a package, an envelope, a flat, a mailpiece, a box, a suitcase, and the like, that can be transported from one location to another by a distribution entity. An item can also be a product or good which can be transported within a parcel, package, envelope, etc. A distribution entity may be an entity engaged in transporting items from one location to another, such as the United States Postal Service (USPS), another commercial carrier, a storage facility, a fulfillment warehouse, a luggage sorting facility, or any other similar facility, company, or entity.

Consumers or item purchasers regularly need to return the item to the seller or provider. Items can be purchased in a brick and mortar store or in an e-commerce or online context. It can be difficult for a consumer to return an item at the consumer's own time and expense, and/or must contact the seller or provider for returns authorization. All this can be difficult. A distribution network, such as the USPS, can advantageously provide systems and processes which will enable a consumer to return any item, regardless of where or how it was purchased, and regardless of which distribution network delivered the item to the consumer.

A system for providing such return service can be called universal returns. The returns system can be advantageously used in several scenarios, including: returning an item via the distribution network that delivered the item (e.g., returning with USPS an item delivered by USPS); returning an item via a different distribution network than the distribution network that delivered the item (e.g., returning via USPS an item delivered by another entity); and returning an item via a distribution network which was purchased at a retail establishment or brick and mortar store (e.g., returning via USPS an item purchased at a store). To facilitate a universal returns program, a distribution network can receive and store shipping information (mail class, payment, etc.) for item sellers or providers, such as merchants. The merchants can provide line item detail including product information for items inside the box, return expiration, etc. to the distribution network either via a file or a code on a receipt or shipping packing list.

For items delivered via USPS, the shipment data, including the return information is linked with USPS delivery notification system for a seamless return experience. For items delivered by distribution networks other than the distribution network for the return shipment, or for items purchased in a store, a code, symbol, badge, etc., on the receipt can be used to initiate a return process.

An exemplary process can be as follows: A recipient of an item may wish to return an item via a distribution network, such as the USPS. The recipient can initiate a returns process. The user can initiate the returns process on a mobile platform, using a voice command with a smart speaker, on a web-based interface, or via another computing process.

The return can be initiated by scanning a universal returns badge. A USPS badge, which can use a QR code or other type of construct, can be used. The badge can be specific to the universal return ("UR") program. The badge is printed either on a retail receipt or a receipt, packing slip, or other documentation provided in a received package. The badge can encode all the relevant information for the return shipment, encode some of the relevant information, and/or can provide a pointer to the location of the information for the return shipment. In some embodiments, the pointer can be the unique purchase identifier or return request identifier associated with the transaction information. In some embodiments, the badge can encode a return request identifier for a return which can be provided by the universal returns system, a merchant system, and can be associated with the unique purchase identifier and the transaction information. The return request identifier can be used to obtain the transaction information and item information for initiating a returns process. The identifier can be associated with transaction information and return information for a purchase. The information for the return shipment can be obtained, for example, using an API. The return information can include, among other information, the item information (SKU), an order number, a return facility (where to send the item), a return expiration date, a return authorization, and/or a merchant identifier (MID).

In some embodiments, the services used by a mobile application to initiate a return can be utilized by integrating vendors/merchants with the distribution network for initiating returns. This allows for hybrid approaches where a customer can initiate a return with the USPS through a merchant website.

When using a voice prompt with a smart speaker, the recipient may use, from the receipt, a shipping insert, and/or packing slip, a human readable code with the badge along with the integration to provide the associated badge information. The human readable code can be associated with the shipment information, and voice prompts can be used to request which item to return when more than one item was received in a single shipment.

In order to provide a UR experience for items purchased from merchants, either in e-commerce or in brick-and-mortar stores, the merchant can be integrated into the UR system. The UR system can have a backend function that retrieves sufficient information to generate a return label and confirms the Return Merchant Authorization (RMA) for the return. The merchant can supply the badge, and the information will be received by the mobile application upon scanning it. As mentioned in the above scenarios for the voice experience, an extension of this concept would allow merchants to provide USPS with the QR code or other computer readable code data along with an identifier for the QR code. This allows for an enhanced voice experience (read the identifier of the QR code to initiate a return), and includes shipper/merchant specific integration.

After the return information is received, the distribution network can generate a return label. In some embodiments, label generation is a USPS function that generates a return shipping label and assumes sufficient information has been received to do so from through merchant integration. In some embodiments, the label can be generated by the merchant or a third party. There may be multiple return locations and label types that must be supported depending on the customer return requirements (full network return label, PRS label for first mile, return to store, etc.).

A customer may not wish to print the label at home, and so may request an alternate means for getting a label. In some embodiments, the distribution network can provide an item code. The item code can be an 8-character code (or any number of characters, as desired). The customer can simply write the code on the item to return. The distribution network can generate a label for the item using the item code. This can occur after the distribution network has picked up the item.

In some embodiments, the merchant, seller, shipper, etc., may have already created a return label, in the case that a recipient desires to return an item. In this case, the merchant can have an item code, such as an 8-character code, and can provide that information to the recipient, directly or via the distribution network, when the recipient requests a return. In some embodiments, the merchant can re-route the item via an API and provide their own label to replace the generated label. In this step, the customer simply writes the item code on the item, or provides the item code via voice or mobile interface on the package as it represents a return label image.

The customer can then, via the computer interface, schedule a pick-up of the item. The item pick-up can be scheduled for the next business day from the time of initiation as it would allow carriers to always pick-up while on their route. In some embodiments, the schedule pick-up option can allow for time windows or factor in awareness of carrier location on the route to allow more options for when the package is left for carrier pick-up.

The recipient returning the item can track the return via the computing device by entering or using the item code.

FIG. 1 represents one embodiment of a system 100 for managing universal returns. In some embodiments, system 100 comprises a system hub 101. The system hub 101 may comprise or be a component of a processing system implemented with one or more processors. The system hub 101 may be a network of interconnected processors housed on one or more terminals. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The system hub 101 may comprise a processor 111 such as, for example, a microprocessor, such as a Pentium® processor, a Pentium® Pro processor, a 8051 processor, a MIPS® processor, a Power PC® processor, an Alpha® processor, a microcontroller, an Intel CORE i7®, i5®, or i3® processor, an AMD Phenom®, A-Series®, or FX® processor, or the like. The processor 111 typically has conventional address lines, conventional data lines, and one or more conventional control lines. The processor 111 may be in communication with a processor memory 112, which may include, for example, RAM memory, flash memory, ROM memory, EPROM memory, EEPROM memory, registers, hard disk, a removable disk, a CD-ROM, or any other form of storage medium known in the art. The processor memory 112 may include, for example, software, at least one software module, instructions, steps of an algorithm, or any other information. In some embodiments, the processor 111 performs processes in accordance with instructions stored in the processor memory 112.

The system hub 101 comprises a system memory 113 configured to store information, such as delivery object assignments, ownership information and the like. The system memory 113 may comprise a database, a comma delimited file, a text file, or the like. The system hub 101 is configured to coordinate and direct the activities of the components of the system 100, and to coordinate generating delivery object associations and delivery object ownership data.

In some embodiments, the system hub 101 is in communication with a merchant database 110. In some embodiments, the merchant database 110 may comprise a processor, memory, databases, address and control lines, and other components similar to those described herein for the system hub 101. In other embodiments, the merchant database 110 may be configured to use the processor, memory, databases, address and control lines, and other components of system hub 101, or a combination of its own components and the system hub 101's components.

In some embodiments, the merchant database 110 can interface with external merchant systems using an API and communicating via a communication module 170. In some embodiments, merchant systems can be computer systems associated with and/or operated by brick and mortar retailers, e-commerce merchants, online retailers or marketplaces, and the like. In some embodiments, the merchant database 110 can be a part of a merchant's system or network, and can be in communication with the system 100 via an API or other similar communication method. In some embodiments, the merchant database may be managed by a third party.

The merchant database 110 receives and stores information from merchant systems regarding the purchase of items, shipping labels and information, purchaser information, and the associated receipts, codes, item information, customer information, etc. for particular purchases. The merchant database 110 can generate purchase information and/or item information when a purchase is made, shipped, delivered, picked-up, or at any other desired time. In some embodiments, the merchant database 110 can receive purchase information from a merchant's systems, and can create a purchase record. The purchase information can include an identifier of the items, including SKUs, UPC codes, item names and/or description, etc. The purchase information can also include purchaser information, payment information, returns information, such as a return merchant authorization, rules on returns, and any other desired information. In some embodiments, the purchase information can be identified by or associated with a unique identifier. The unique identifier can be a code, such as a human or computer readable code, which is associated with the purchase information in the merchant database 110.

In some embodiments, the purchase information can include a receipt, such as an image of a physical receipt, or an electronic receipt, which can include a complete list of the purchased items for a transaction. In some embodiments, the merchant database 110 generates a unique identifier for every purchase or transaction in the database. In some embodiments, the merchant database 110 receives the unique identifier from the merchant's systems.

In some embodiments, the unique identifier can be incorporated into a scannable QR code or other scannable code such as a badge. In some embodiments, the badge can be a scannable picture that can be printed onto receipts such that scanning the picture with a mobile phone or other scanner can identify the code associated with that receipt. In some embodiments, the merchant database can also receive return information along with each receipt. The return information contains the particular instructions for how that merchant would prefer that items on the receipts will be returned if necessary. For example, the return information can contain the address that the items should be returned to and the preferred type of shipping for any returns. In some embodiments, the return information can also contain information regarding how any return shipping will be paid for. For example, the merchant can specify that the merchant will pay some or all of the cost for return shipping, or that the customer will pay some or all of the cost, or that the entity that is operating the system 100 will pay some or all of the costs.

In some embodiments, the system hub 101 is in communication with a carrier database 120. In some embodiments, the carrier database 120 may comprise a processor, memory, databases, address and control lines, and other components similar to those described herein for the system hub 101. In other embodiments, the carrier database 120 may be configured to use the processor, memory, databases, address and control lines, and other components of system hub 101, or a combination of its own components and the system hub 101's components.

In some embodiments, carrier database 120 can interface with carrier systems to determine deliveries that were made at a particular addresses and time and the items within that delivery. The carrier database 120 can contain or have access to the location of delivery resources, such as carriers, vehicles, etc.

In some embodiments, the system hub 101 is in communication with a delivery database 130. In some embodiments, the delivery database 130 may comprise a processor, memory, databases, address and control lines, and other components similar to those described herein for the system hub 101. In other embodiments, the delivery database 130 may be configured to use the processor, memory, databases, address and control lines, and other components of system hub 101, or a combination of its own components and the system hub 101's components.

In some embodiments, delivery database 130 contains a record of all of the deliveries performed by the distribution network. The database also contains return information for any delivery. The return information contains the particular instructions for how return items that were delivered. For example, the return information can contain the address that the items should be returned to and the preferred type of shipping for any returns. In some embodiments, the return information can also contain information regarding how any return shipping will be paid for. For example, the return information can specify that the original shipper will pay some or all of the cost for return shipping, or that the person who received the delivery will pay some or all of the cost, or that the entity that is operating the system 100 will pay some or all of the costs. The information described herein with regard to the delivery database 130 can be stored in or associated with another system without departing from the scope of the present disclosure.

In some embodiments, the system hub 101 is in communication with a return label generator 140. In some embodiments, the return label generator 140 may comprise a processor, memory, databases, address and control lines, and other components similar to those described herein for the system hub 101. In other embodiments, the return label generator 140 may be configured to use the processor, memory, databases, address and control lines, and other components of system hub 101, or a combination of its own components and the system hub 101's components.

In some embodiments, the return label generator 140 can generate return codes or return labels for any returns based on the return information associated with a particular return in the delivery database 130, merchant database 110, and/or carrier database 120. In some embodiments, the return code or return label can then be sent on through communication module 170 to a customer or entity seeking to return items. In some embodiments, the return label can comprise a return address and instructions on how to pay for shipping. In some embodiments, the return label generator 140 can calculate the cost of shipping for the person seeking to deliver items based on the return information associated with a particular return and any option that the person returning has selected. For example, the return label generator 140 can increase the cost of the return if a personal pickup of the returned item is selected instead of having the item dropped off at a shipping location. In some embodiments, the generated return code can be a single alphanumeric code that the person wishing to return the item can write on the package. A mail processing system can then use this single code to retrieve all of the return information and the appropriate mailing instructions. This process will be described in more detail elsewhere herein.

In some embodiments, the system hub 101 is in communication with a pick-up scheduler 150. In some embodiments, the pick-up scheduler 150 may comprise a processor, memory, databases, address and control lines, and other components similar to those described herein for the system hub 101. In other embodiments, the pick-up scheduler 150 may be configured to use the processor, memory, databases, address and control lines, and other components of system hub 101, or a combination of its own components and the system hub 101's components.

In some embodiments, pick-up scheduler 150 can schedule the pick-up of an item for return. In some embodiments, the pick-up scheduler can receive the date and time that a person returning an item wishes a pick-up to occur and then schedule the appropriate pick-up. The pick-up scheduler is in communication with the carrier database 120 to receive carrier locations, schedules, volumes, etc.

In some embodiments, the system hub 101 is in communication with a tracking database 160. In some embodiments, the tracking database 160 may comprise a processor, memory, databases, address and control lines, and other components similar to those described herein for the system hub 101. In other embodiments, the tracking database 160 may be configured to use the processor, memory, databases, address and control lines, and other components of system hub 101, or a combination of its own components and the system hub 101's components. The tracking database 160 contains information that can be used to track the progress of an item as it moves through the distribution network as it is being delivered and returned.

In some embodiments, system hub 101 is in communication with communication module 170. In some embodiments, the communication module 170 may comprise a processor, memory, databases, address and control lines, and other components similar to those described herein for the system hub 101. In other embodiments, the communication module 170 may be configured to use the processor, memory, databases, address and control lines, and other components of system hub 101, or a combination of its own components and the system hub 101's components.

In some embodiments, communication module 170 is responsible for communications between the system 100 and other devices via wired and/or wireless communication. In some embodiments, the communication module 170 communicates via telephone, cable, fiber-optic, or any other wired communication network. In some embodiments, the communication module 170 may communicate via cellular networks, WLAN networks, or any other wireless network. In some embodiments, the communication module can be used by any component of system 100 to communicate with devices outside of the system 100.

Figure 2:
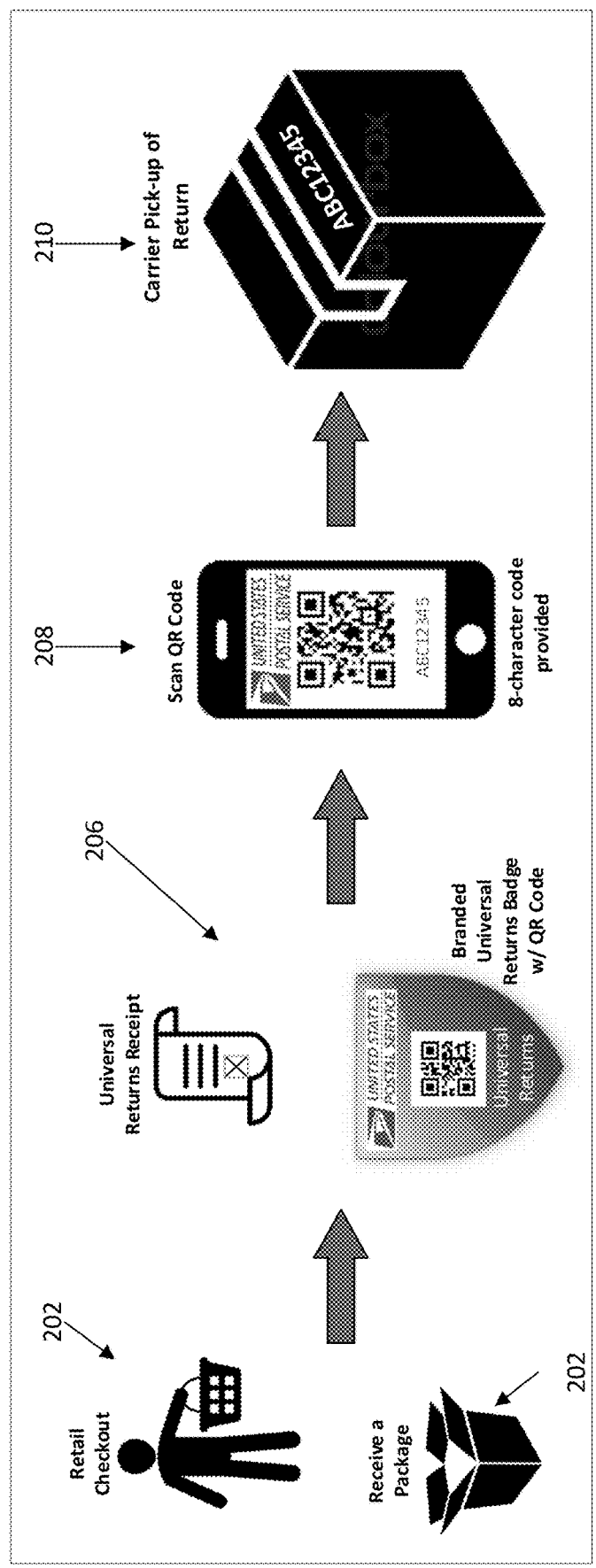
FIG. 2 is a diagram depicting an exemplary returns process.

FIG. 2 depicts an exemplary returns process. In a step 202, a user can make a purchase at a retail location. In a step 204, a user can receive an item via a distribution network. The received item can have been purchased online, via a catalog, or other means. In a step 206, the user can be given a universal returns receipt. In a case where the item was delivered, the item can have a universal returns code on a shipping manifest, or on an enclosed receipt. This receipt can have a universal returns code, such as a unique identifier, or have a universal returns badge, or both, thereon. The unique identifier or the badge can encode or be associated with relevant information for the return. In a step 208, the user can input or scan the unique identifier or the badge using a smartphone or computing device. When the unique identifier or badge is received, the distribution network can obtain the relevant information needed for the shipment. This process will be described in greater detail elsewhere herein.

When the returns information is obtained, the user can schedule a pick-up of the item to be returned, and the distribution network or merchant can provide an alphanumeric code to the user. In step 210, the user puts the code on the item to be returned and the carrier picks up the item to be returned at the scheduled pick-up time.

Figure 3:
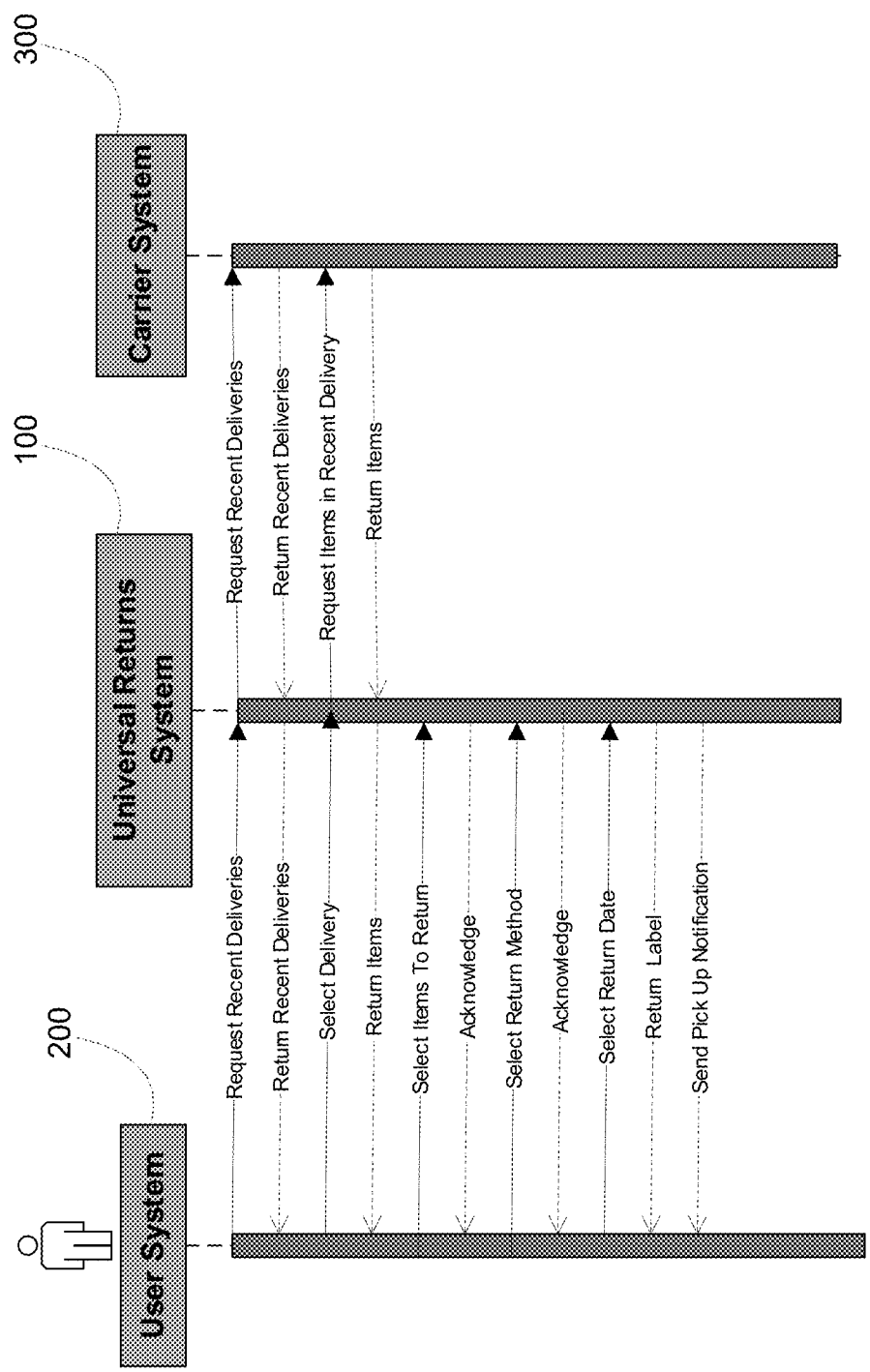
FIG. 3 depicts an embodiment of a message passing diagram between a user system, a universal returns system, and a carrier system.

FIG. 3 depicts an embodiment of a message passing diagram between a user system 200, the system 100, and a carrier system 300. In some embodiments, user system 200 can be a mobile phone or computer running a software or web application. In some embodiments, the user system 200 can also be controlled via voice commands.

In some embodiments, the user system 200 begins message flow by requesting recent deliveries from the universal returns system 100. In some embodiments, recent deliveries can mean any delivery within the last day, week, month, year, or so forth. The universal returns system 100 can then query carrier system 300 for any recent deliveries made by the outside carriers. The carrier system 300 then responds with information regarding recent deliveries, including the return information for each delivery. In some embodiments, the universal return system 100 can query multiple carrier systems 300 for this information. In some embodiments, the universal return system 100 can have already received information on prior deliveries and does not have to request them from carrier system 300.

Once the universal returns system 100 receives the recent deliveries from carrier system 300, the system 100 determines if the entity operating the system 100 has performed any recent deliveries itself, and then sends a list of all recent deliveries back to user system 200. The user then selects the relevant delivery and sends that information on to system 100.

Once system 100 has received the selected delivery, it requests a list of all the items within that delivery from carrier system 300. The carrier system 300 then responds with information regarding the items within the delivery. In some embodiments, the universal return system 100 can have already received information on prior deliveries and does not have to request them from carrier system 300. In some embodiments, this entire step is unnecessary if the selected delivery was performed by the entity operating the universal returns system 100 and not an outside carrier.

Once the universal returns system 100 receives the list of items from carrier system 300, or determines the list itself, the system 100 returns the information to the user system 200. The user system 200 then selects the items to be returned. The universal returns system 100 responds with an acknowledgment message.

Next, the user system 200 selects a return method for the item, such as pick-up or drop off. The system 100 again responds with an acknowledgment message. Finally, the user system 200 selects a return date. The system 100 then generates a return label for the return. In some embodiments, the system 100 can use the return label generator 140 to generate the return label in the manner previously described. Finally, the system 100 sends a pick-up notification on the day that the pick-up is scheduled.

Figure 4:
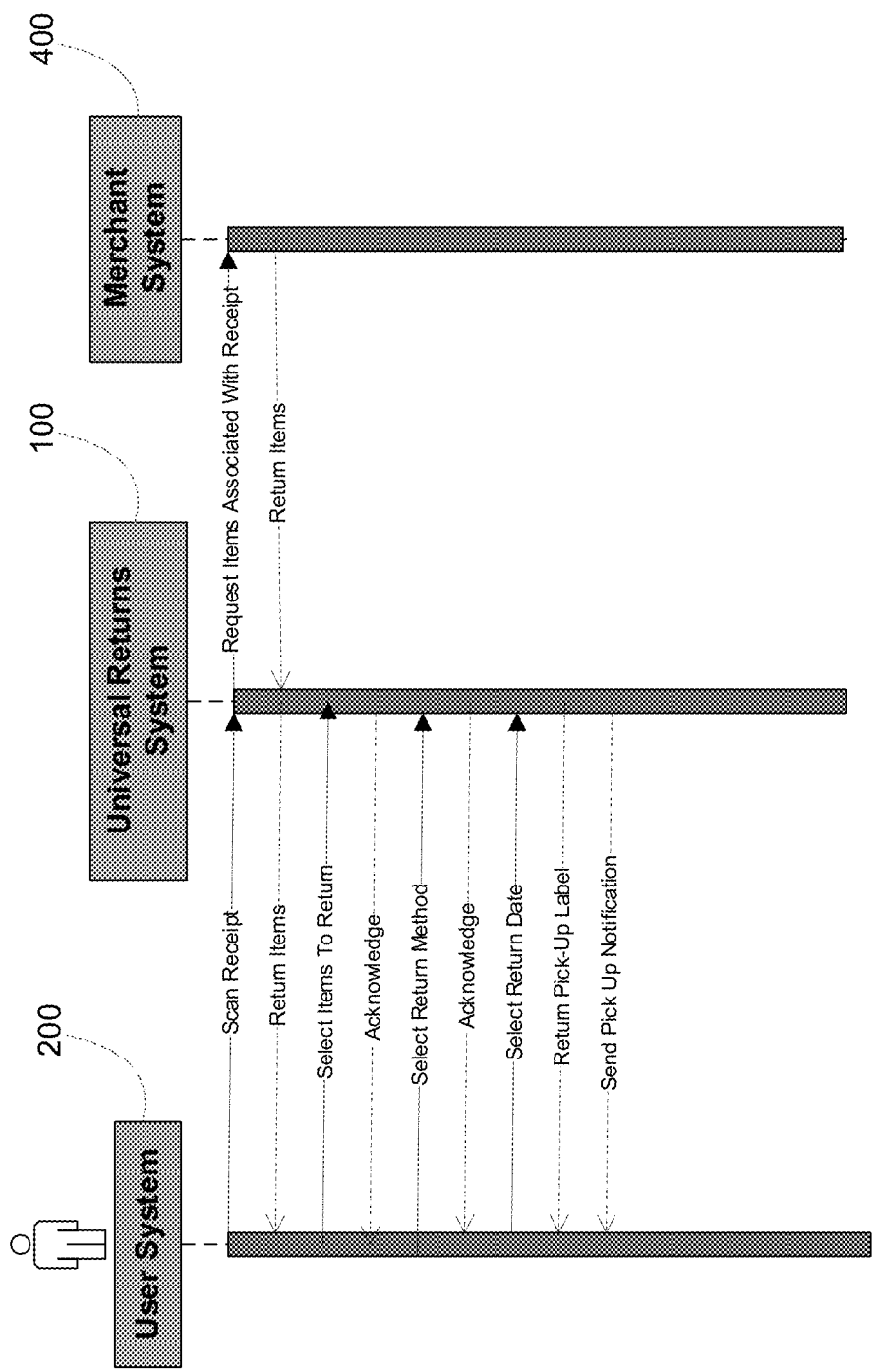
FIG. 4 depicts an embodiment of a message passing diagram between a user system, a universal returns system, and a merchant system.

FIG. 4 shows a message flow diagram that displays one embodiment of a message flow between a user system 200, the universal returns system 100 and the merchant system 400. In some embodiments, user system 200 can be a mobile phone or computer running a software or web application. In some embodiments, the user system 200 can also be controlled via voice commands. The message flow begins with user system 200 scanning a receipt of items purchased. In some embodiments, the message flow can begin with a user providing a voice command to a smart speaker and providing a unique identifier from the receipt or shipping manifest. In some embodiments, the user system 200 can scan a QR code or a badge on the receipt and then transmit the information retrieved from the scan to the universal returns system 100.

The system 100 then requests all the items associated with the receipt from the appropriate merchant system 400, along with the appropriate return information, and the merchant system 400 responds. In some embodiments, the system 100 has already received the items associated with receipt and the appropriate return information from merchant system 400 and does not have to request the information from the merchant system 400. In some embodiments, the merchant system 400 provides the purchasing information, item information, transaction information, etc. to the universal returns system 100 when the item(s) are purchased, when they are picked up, and/or when they are shipped. In this case, the merchant system 400 does not wait until the universal returns system 100 requests the purchase information to initiate the return. Where the merchant system 400 has previously provided the purchase information, the universal returns system 100 saves the information regarding the purchase and the returns, and when the receipt is scanned, the universal returns system 100 access the stored information.

In some embodiments, the purchase information is not provided to the universal returns system 100 until the user has initiated a returns process and the universal returns system 100 requests the information from the merchant system 400. In some embodiments, the user can initiate a return by scanning a badge on a receipt, or inputting an identifier, which will route messages through the merchant system 400 first, and the merchant system 400 can then route the messages and/or the user computing device to the universal returns system 100.

In some embodiments, where the receipt or shipping manifest has a QR code or a badge thereon, the purchase information can be stored in the QR code or badge itself. For example, the list of items purchased, the return location, etc., can be encoded or stored within the QR code or the badge. When the badge or QR code is scanned, the universal returns system 100 extracts the required information from the QR code or the badge.

Once the universal returns system 100 receives the items from the merchant system 400, it returns the items to user system 100. The user system 200 then selects the items to be returned. The universal returns system 100 responds with an acknowledgment message.

Next, the user system 200 selects a return method for the item, such as pick-up or drop off. The system 100 again responds with an acknowledgment message. Finally, the user system 200 selects a return date. The system 100 then generates a return label for the return. In some embodiments, the system 100 can use the return label generator 140 to generate the return label in the manner previously described. Finally, the system 100 sends a pick-up notification on the day that the pick-up is scheduled.

Figure 5:
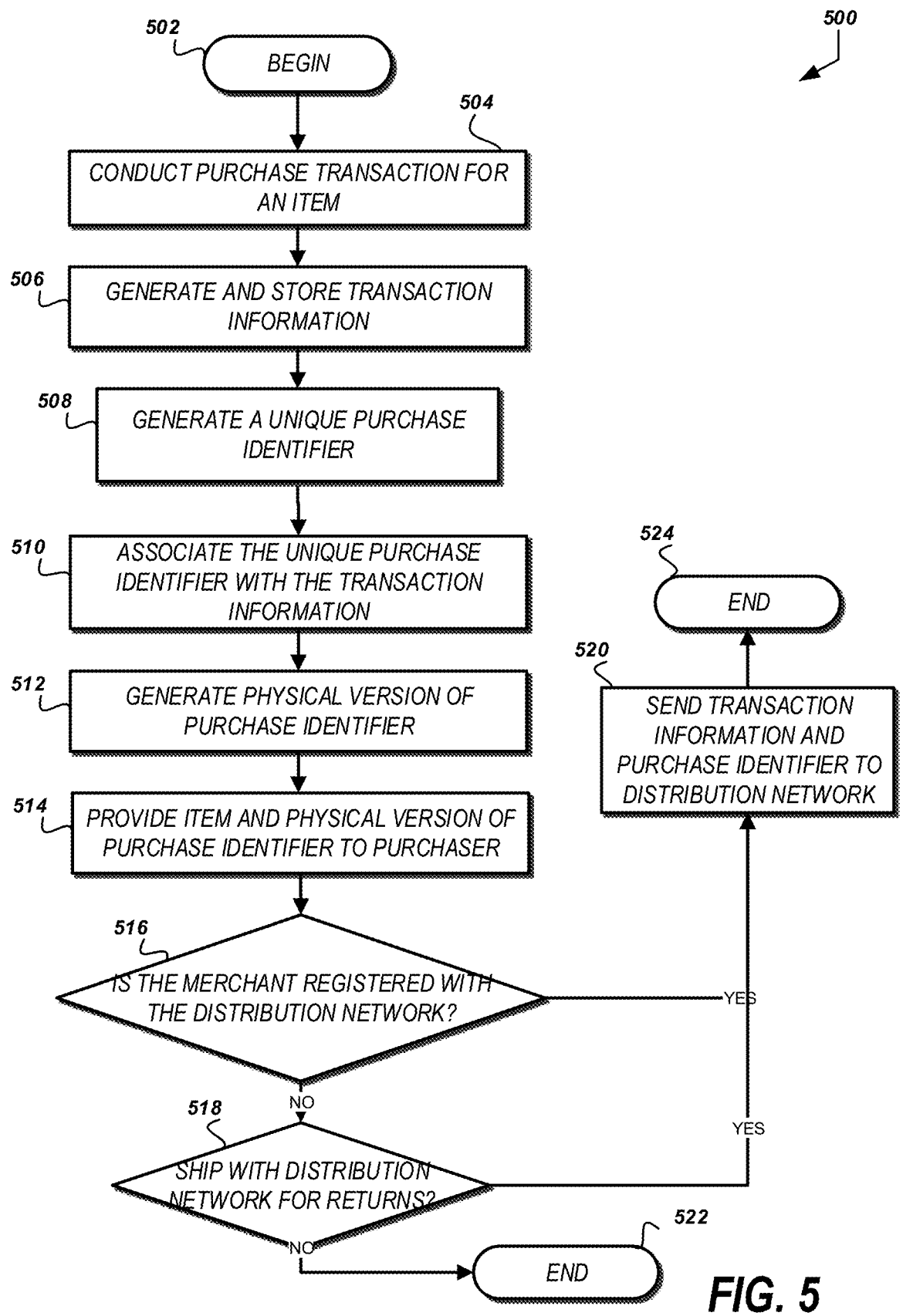
FIG. 5 is a flowchart depicts an exemplary process for generating transaction information.

FIG. 5 depicts an exemplary process for generating transaction information. A process 500 begins in step 502. The process 500 moves to step 504, wherein a merchant conducts a purchase transaction for an item. The purchase transaction can occur at a retail location, such as a brick and mortar store, or can occur online, via telephone, catalog, or any other purchasing methods. In some embodiments, the purchase transaction can include more than one item.

In an exemplary process, a merchant can be a clothing store, and the items purchased can be items of clothing. The process 500 will be described with regard to purchasing the as an explanatory example, and is not intended to be limiting.

The process 500 moves to step 506, wherein the merchant generates and stores transaction information for the purchase transaction. The transaction information can include item information, such as a SKU or UPC code, item colors, patterns, sizes, etc. The transaction information can also include a return location or a location to where the item should be returned, a return expiration date, a merchant identifier, payment information, purchaser information, and any other desired information. The transaction information can include a return location of the clothing merchant's distribution center, a return expiration of 60 days (or any other desired period), etc. Where a purchase transaction involves the purchase of a plurality of items, the transaction information can include item information for each of the items in the purchase transaction. The transaction information is stored in a data store associated with the merchant, or in another data storage location.

In the example of the clothing store, the transaction information can include all the items listed above, including item information for each of the articles of clothing purchased in the transaction. The item information for each of the articles of clothing purchased can include a SKU for each item, information regarding the style, color, size, price, sale status, etc., for each article of clothing purchased.

The process 500 moves to step 508, wherein a unique purchase identifier is generated. In some embodiments, the unique purchase identifier can be an alphanumeric code or a computer readable code. The process 500 moves to step 510, wherein the unique purchase identifier is associated with the transaction information for the item(s). Where a transaction involves the purchase of more than one item, the unique purchase identifier can be associated with the transaction information for the multiple items purchased in the transaction. For example, where several items of clothing are purchased in one transaction, the transaction information would include item information for all the items purchased, and the unique purchase identifier would refer or be associated with all the items purchased.

The process 500 moves to step 512, wherein a physical version of the unique purchase identifier is generated. The physical version of the unique identifier can be an alphanumeric code or badge printed on the sales receipt, or can be printed on the shipping insert or manifest in a case where items are to be delivered to the purchaser. In some embodiments, a purchaser may have requested an electronic receipt and provided contact information as a part of the purchase transaction. In such a case, generating the physical version of the unique purchase identifier can include the generation of an electronic image or representation of the unique purchase identifier.

The process 500 moves to step 514, wherein the item(s) and the physical version of the unique purchase identifier are provided to the customer or recipient. In some embodiments, this can occur in a retail location, when the customer takes the items and a receipt after paying. In some embodiments, this can occur when the items are delivered to the recipient, together with a receipt, shipping insert, shipping manifest, or on a return document included with the shipment.

The process 500 moves to decision state 516, wherein it is determined if the merchant is registered with the distribution network and/or the universal returns system. A merchant may be part of the universal returns system and can offer services of the universal returns system to its customers. If the merchant is registered with the distribution network and/or the universal returns system, the process moves to step 520, wherein the merchant sends the transaction information and the unique purchase identifier to the distribution network and/or the universal returns system. The merchant can push the transaction information and the unique purchase identifier associated with the transaction to the universal returns system, which can store the information for a time when a customer or recipient requests to initiate a return of an item purchased in the transaction.

In some embodiments, the merchant can provide this information via an API. In some embodiments, the merchant does not generate the unique purchase identifier, but requests the universal returns system provide the unique purchase identifier. When a transaction occurs with a merchant who has registered with the universal returns system completes a purchase transaction, the merchant system can request, for example, via an API, a unique purchase identifier from the distribution network. In this case, the generation of the unique purchase identifier in step 508 can be determined by the universal returns system and communicated to the merchant, who can then include the unique purchase identifier on the receipt or shipping documents.

Generating unique purchase identifiers in the universal returns system and communicating those identifiers to the merchants can be advantageous to avoid different merchants providing identical purchase identifiers to the universal returns system. In some embodiments, the unique purchase identifier can include an identifier of the merchant, such as a merchant ID, in order to prevent duplication of purchase identifiers, and to ensure each purchase identifier is unique to a transaction.

In some embodiments, purchase identifiers can expire, such as after a returns expiration date. In this way, the unique purchase identifiers do not need to be too long or overly complex, and purchase identifiers can be repeated without confusion or error. When a merchant offers a 90-day return window, any unique purchase identifier associated with a transaction at that merchant will expire after the 90-day return window has passed. The expired unique purchase identifier can be re-used after the 90-day return window has passed. The returns windows can be tracked in the merchant systems and/or the universal returns systems, and appropriate communication between the systems can occur regarding the validity of purchase identifiers for use in returns applications.

If the merchant is not registered with the distribution network, the process 500 moves to decision state 518, wherein it is determined whether items were shipped with the distribution network which provides the universal returns system. If the items were shipped, for example, via USPS, and USPS is offering the universal returns system, the merchant can provide the transaction information and item information to the USPS universal returns system, where it will be stored. In this case, the USPS can generate the unique purchase identifier and include the identifier on the shipping insert, manifest, or on a return authorization document included with the items. The identification of USPS as the delivering distribution network can be part of the purchase transaction, and the USPS can generate the unique purchase identifier in step 508. In some embodiments, the USPS receives the transaction information from the merchant, and the USPS generates the unique identifier and includes the physical version of the unique purchase identifier with the items when they are delivered to the purchaser. In some embodiments, decision state 518 can occur at a different point in process 500, as will be understood by one of skill in the art.

If the item is not being shipped via the distribution network offering the universal returns system, the process 500 ends in step 522. Returning to step 520, the process 500 can then move to step 524 and end.

Figure 6:
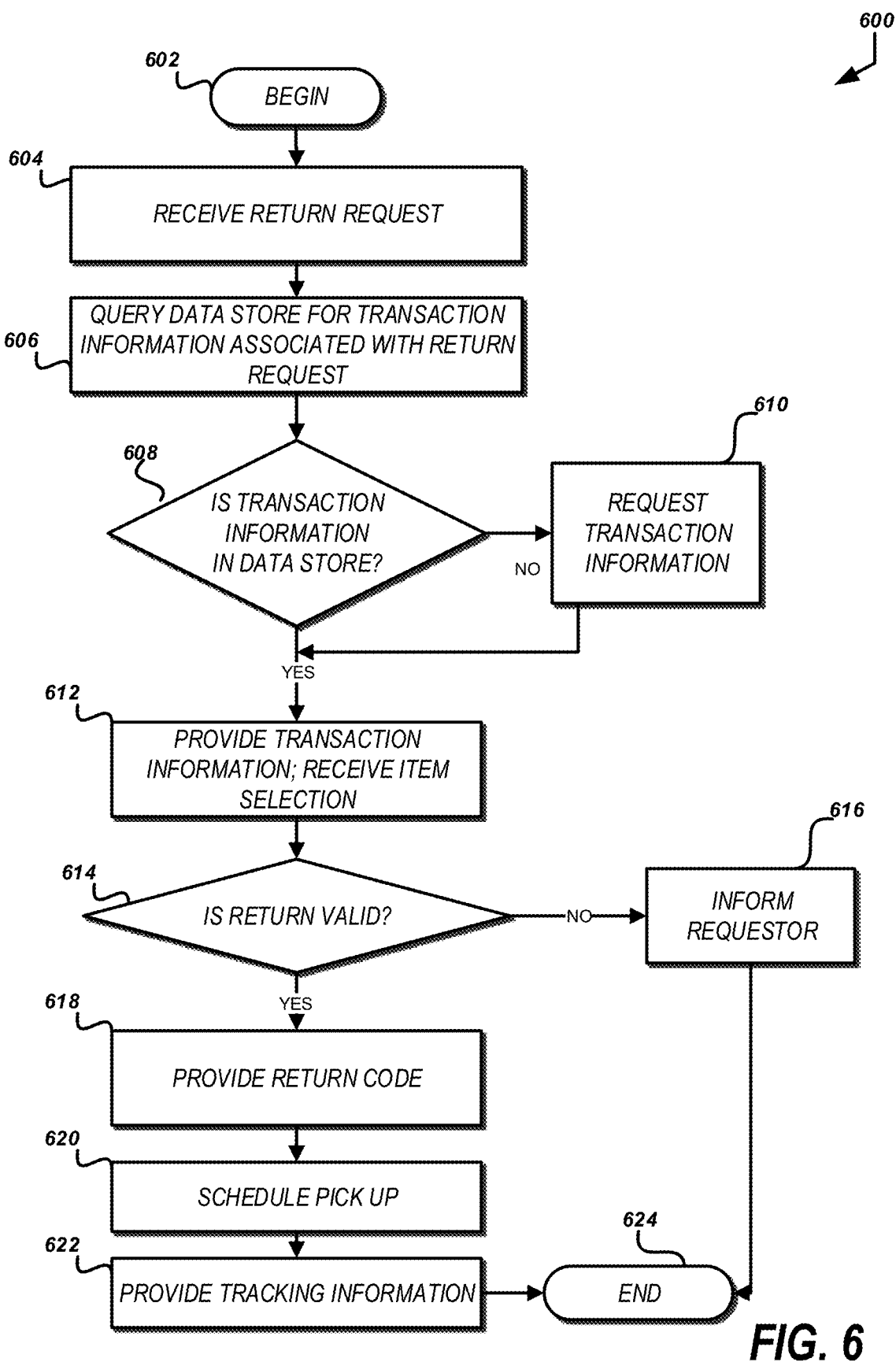
FIG. 6 is a flowchart depicts an exemplary process for initiating a return process.

FIG. 6 is a flowchart depicts an exemplary process for initiating a return process. A process 600 begins in step 602. The process 600 moves to step 604 wherein a return request is received from a user. A return of an item can be initiated when a user requests, using a computing device, to return an item from a transaction. This can be done by providing, via a user interface, a return request identifier. In some embodiments, the unique purchase code can be the return request identifier. In some embodiments, the return request identifier can be a separate identifier which is related to and/or associated with the unique purchase identifier. The returns request identifier can be used to obtain the transaction information for a purchase transaction associated with the unique purchase identifier. In some embodiments, the return request identifier can be located on a receipt, packing slip, etc. in some embodiments, the return request identifier can be encoded within a badge on a sales document, receipt, packing slip, etc. The request can be made using an application running on a mobile computing device. A user can open an application, such as a universal returns application, or another application associated with the distribution network providing the return service. The user can use the mobile computing device to input the unique purchase identifier. This can be done by inputting an alphanumeric unique purchase identifier. In some embodiments, the purchase identifier can be inputted by scanning a badge for the universal returns system located on a receipt or on a shipping document.

A user can initiate a return by selecting an item in a notification application or program. A user can be subscribed to an alert service from the distribution network, for example, the Informed Delivery® service from the USPS. In the Informed Delivery® service, a recipient can get an image and/or notification of items to be delivered or which were delivered in a day. To initiate a return, the recipient can select the item to return from an interface of the notification service, such as by tapping on an image or a tracking number, and selecting an option to initiate a return. The Informed Delivery® system can have access to the transaction information and/or the unique purchase identifier, so when the item is selected in the interface, a returns process can be initiated.

The process 600 moves to step 606, wherein the data store is queried for transaction information associated with the unique purchase identifier. In some embodiments, the query can be performed by querying the merchant database 110 to obtain information previously stored by the distribution network and associated with the unique purchase identifier.

The process moves to decision state 608, wherein it is determined whether the universal returns system has the transaction information in a data store. If so, the process moves to step 612, wherein the transaction information is provided to the user requesting the return. In some embodiments, the transaction information can be encoded or contained in the unique purchase code, such as in the case of a QR code or in the badge.

If the universal returns system does not have the transaction information stored, the process 600 moves to step 610, wherein the universal return system requests the transaction information from the merchant system. The universal returns system can identify the merchant from the unique purchase identifier, such as, by reading a merchant ID located in the unique purchase identifier. The universal returns system can then contact the identified merchant using the unique purchase identifier to request the transaction information associated with the unique purchase identifier. The merchant systems can retrieve the transaction information associated with the unique purchase identifier and provide the transaction information to the distribution network.

The process 600 moves to step 612, wherein the transaction information is provided to the user requesting the return. The universal returns system can provide the transaction information, including item information to the user via the application on the mobile computing device, via a web portal, or other computing interface. The displayed transaction information can be interactive, such that the user can select one or more of the items for which the item information is provided, for return. In the example of the clothing store, a purchaser may have purchased a shirt, a pair of pants, and shoes, or any other items. The computing interface will display the shirt, pants, and shoes in a list, by icons, etc., and request a selection of items to be returned. The user can select the shirt, the pants, the shoes, all three, or any combination of the items to return. If the user wishes only to return the shirt, then the user can select the shirt for return in the computing interface.

The process 600 moves to decision state 614, wherein it is determined whether the return is valid. The universal returns system may have the return program rules or requirements stored in a data store, or may request this information from the merchant system. The universal returns system can send a request to the merchant system asking whether the selected item is available for return. The universal returns system can send the item information for the selected item, including date of purchase, an item identifier, such as a SKU, item description, etc. The merchant can use the provided information to determine whether the item is eligible for return. For example, if the return was requested outside the return window, or if the particular item is not returnable, e.g., computer software, or some other item, the merchant can inform the universal returns system. The process 600 moves to step 616, wherein the universal returns system informs the user via the computing interface that the item is not eligible for return, can instruct the user to contact the merchant, provide merchant contact information, or another desired action.

If the return is valid, the process 600 moves to step 618, wherein the universal returns system provides a return code. The return code can be an alphanumeric string provided to the user via the computing interface. The return code can be associated with a return merchant authorization, which can identify to the merchant what the return is when the item arrives at the merchant facility. In some embodiments, the return code can be an 8-digit code, such that it is easy to remember and unlikely to be incorrectly reproduced by the user. The return code is to be placed on the item for return. This can be done in lieu of providing a shipping label to the user to place on the item. In some cases a user may not have a printer, or may not wish to print a shipping label. The return code can be associated with an electronic label, and can be provided to the user via the computing interface. The return code can be similar to that described in U.S. patent application Ser. No. 15/967,141, filed 30 Apr. 2018, the entire contents of which are hereby incorporated by reference. Using the return code, a user or the distribution network can identify the electronic label associated with the item to be returned, and can provide a label at a convenient location, or at a distribution facility.

The return code can be associated with a label record. The return address in the label record can be the returns address received in the transaction information, or can be the merchant's known return address. In some embodiments, the transaction information will include a return address that is other than the address of the shipping location, originating location, or the brick-and-mortar store location. The label record associated with the return code can also be associated with a payment account, a payment system, and the like. For example, the merchant may pay for return shipping, and can have a payment account set up with the universal returns system. The merchant's payment account can be included in the transaction information, or can be stored in the universal returns system with a merchant's registration information.

The process 600 moves to step 620, wherein the computer interface provides a pick-up scheduling function. The user can select, from the computer interface, a time, date, and location, or any combination of these, for a distribution network resource to come pick up the item. The user is instructed to identify the item using the return code, and leave the item someplace for pick-up, such as on a front porch, in a mailbox, etc. In some embodiments, the computer interface can provide locations of distribution network facilities where the item can be dropped off, deposited, or otherwise provided to the distribution network.

The process 600 moves to step 622, wherein tracking information is provided to the user and to the merchant. For example, the distribution network resource can pick up the item having the return code thereon at the scheduled time and place. The distribution network can retrieve or print a shipping label using the return code, the label having all the return information, including indicia of payment. This can be performed, for example, by a carrier at a carrier vehicle using a mobile printer or at a distribution facility. The label is applied to the item, and the item is inducted into the distribution network. As the item is moved through the distribution network, the distribution network can provide tracking information for the return item.

The user who returned the item can input the return code in the computer interface, in the universal systems program, or in another interface to retrieve tracking information. The distribution network will associate the item, the label, and the scan events for the returned item with the return code. The distribution network can also provide tracking information to the merchant to whom the item is being returned.

The process 600 moves to step 624 and ends.

Figure 7B:
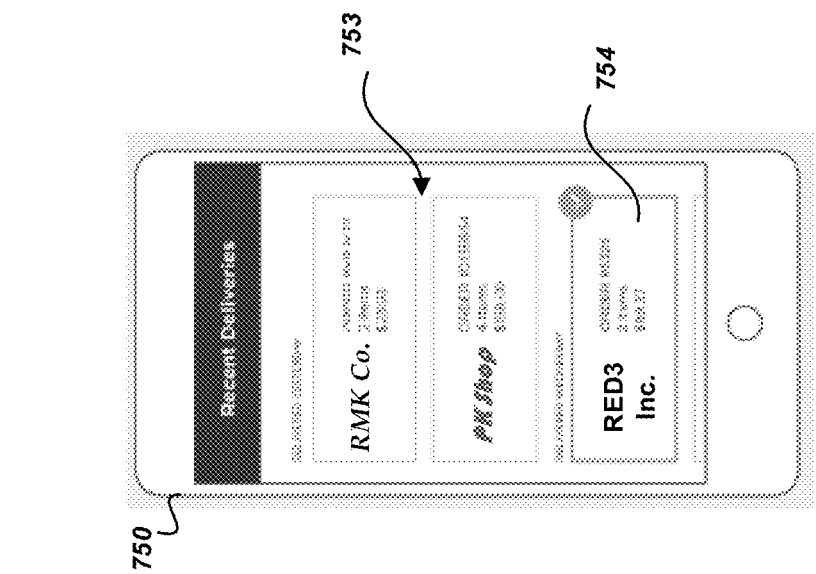
Figure 7A:
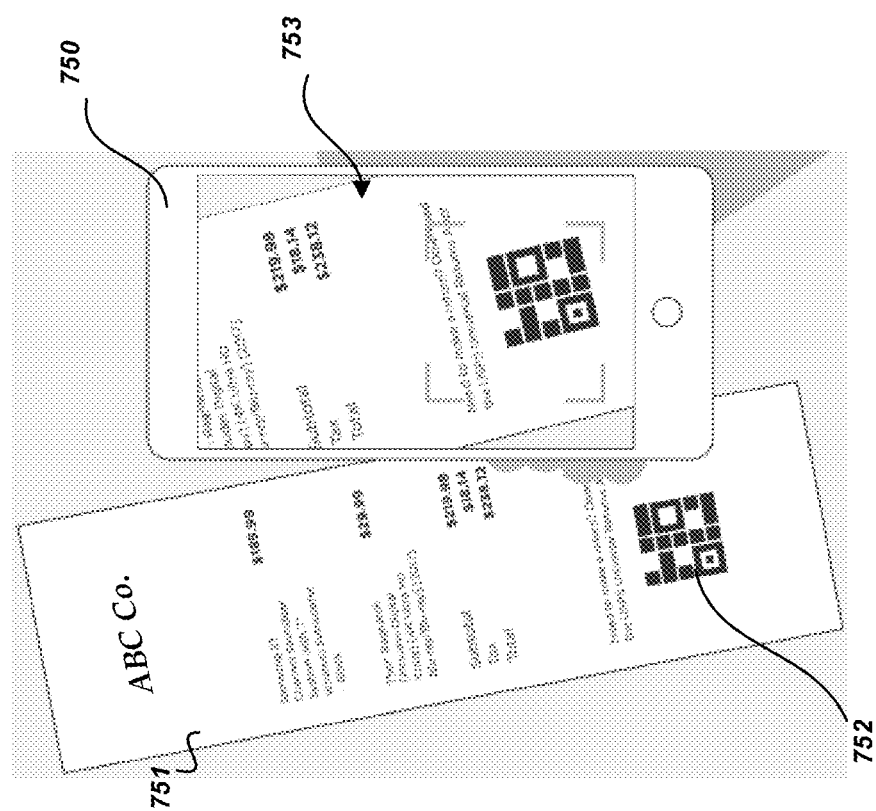

FIGS. 7A-7E display an embodiment of a universal returns interface on a smartphone. FIG. 7A depicts an interface 753 on a mobile computing device 750 used for initiating a return. The smartphone operates an interface 753, which, as described elsewhere herein, can be an application, web portal, computer program, and the like. As shown, a customer has a receipt 751 from a brick and mortar store or from a delivery. The receipt 751 has a QR code 752 printed thereon. The QR code 752 can be similar to the unique purchase identifier described elsewhere herein. The user scans the QR code 752 on the receipt 751 using the mobile computing device 750 operating the interface 753. When the QR code 752 is scanned, the universal returns system retrieves the transaction data associated with the QR code 752 and displays appropriate information on the interface 753.

FIG. 7B displays an embodiment of a mobile application for initiating a return on the mobile computing device 750. As shown, a user may access an account to see a list of recent deliveries or orders on the interface 753. This can be done, for example, in the Informed Delivery® application described herein. The user can see all of the user's recent orders. The user selects the order 754 relating to the item the user wishes to return. When the order 754 is selected, the universal returns system retrieves the data associated with the selected order 754, and displays appropriate information to the user on the interface 753 for the user to continue the returns process.

FIG. 7C an embodiment for selecting an item to return on the mobile computing device 750. The interface 753 displays a list of items associated with the order selected, for example, in FIG. 7A or 7B. The interface 753 displays the items retrieved by the universal returns system. As shown, the order included a shirt and pants. The user wishes to return the shirt, and selects the appropriate item 756 on the interface 753.

FIG. 7D depicts an embodiment of a universal returns interface for determining a return method. The mobile computing device 750 displays the interface 753 which includes an option for returning the item. For example, the user can choose to schedule a pick-up of the item, or can choose to drop the item off at a location, such as a post office. The user wishes to schedule a pickup, and selects the appropriate option 758 for scheduling the pickup. The interface 753 next provides options for pick-up (not shown), such as time, date, location, etc.

FIG. 7E depicts an embodiment of a universal returns interface confirming a return. When the item has been selected for return and the return method determined, the universal returns system, via the interface 753, provides a return code 760. The return code 760 can be similar to that described elsewhere herein. The user can apply the return code 760 to the item to be returned. As shown, the return code is an 8-digit alphanumeric code.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The present disclosure refers to processor-implemented steps for processing information in the system. Instructions can be implemented in software, firmware or hardware and include any type of programmed step undertaken by components of the system.

The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The system hub 210 may comprise a processor 212 such as, for example, a microprocessor, such as a Pentium® processor, a Pentium® Pro processor, a 8051 processor, a MIPS® processor, a Power PC® processor, an Alpha® processor, a microcontroller, an Intel CORE i7®, i5®, or i3® processor, an AMD Phenom®, A-Series®, or FX® processor, or the like. The processors 212 and 305 typically have conventional address lines, conventional data lines, and one or more conventional control lines.

The system may be used in connection with various operating systems such as Linux®, UNIX®, MacOS®, or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the embodiments disclosed herein may be implemented as electronic hardware, software stored on a computer-readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Memory Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), Flash, Java, .net, web services, and rich site summary (RSS). In some implementations, a UI may be included in a stand-alone client (for example, thick client, fat client) configured to communicate (e.g., send or receive data) in accordance with one or more of the aspects described.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

What is claimed is:

1. A method for providing item returns comprising:
   storing, by a merchant database, a plurality of item purchase records, the plurality of item purchase records each comprising item information, purchaser information and a unique identifier;
   generating, by the merchant database, a unique transaction identifier associated with each of the item purchase records;
   generating, by the merchant database, return information for each of the item purchase records based on the item information and purchaser information;
   receiving, by an interface, from a purchaser, a scan of the generated unique transaction identifier and a return request;
   receiving, by a processor, the generated unique transaction identifier;
   querying, by the processor, the merchant database using the received generated unique transaction identifier;
   receiving, by the processor, from the merchant database, the one of the plurality of item purchase records associated with the received generated unique identifier;
   receiving, by the processor, from the merchant database, the generated return information for the item purchase record associated with the received generated unique transaction identifier;
   identifying, by the processor, based on the received item purchase record and the generated return information, a return address to which a returned item will be sent;
   generating, by a return label generator, an electronic return label based on the one of the plurality of item purchase records and the received generated return information, the electronic return label identifying the identified return address;
   sending, by the processor, to a distribution network, the electronic return label;
   sending, by the processor, to the interface, an indicator of the electronic return label; and
   printing, by a printer, at a distribution facility, a physical shipping label having the return address thereon.

2. The method of claim 1, further comprising receiving, in the interface, a merchant identifier; and wherein generating the unique transaction identifier comprises generating the unique transaction identifier further based on the merchant identifier.

3. The method of claim 2, wherein the unique transaction identifier encodes the merchant identifier.

4. The method of claim 1, wherein the unique transaction identifier is a computer readable code.

5. The method of claim 1, wherein the generated return information comprises a return expiration date by which the returned item must be received in the distribution network.

6. The method of claim 1, further comprising:
   determining, by the processor, that the return request is valid based on the one of the plurality of item purchase records; and
   wherein generating, by the return label generator, the electronic return label is based on determining that the return request is valid.

7. The method of claim 1, further comprising:
   receiving, by the interface, merchant registration information; and
   determining, by the processor, based on the received merchant registration, that a merchant is registered with a distribution network.

8. The method of claim 7, further comprising, in response to receiving the return request, charging a shipping fee to the merchant for returning one or more items.

9. The method of claim 1, further comprising automatically dispatching, by a pick-up scheduler, a resource to pick-up one or more items to be returned.

10. The method of claim 1, wherein the indicator of the electronic return label comprises an alphanumeric string, and wherein the alphanumeric string identifies the electronic return label in a database of the distribution network.

* * * * *